United States Patent [19]

Mansukhani

[11] 4,207,577
[45] Jun. 10, 1980

[54] OPAQUE JET INKS

[75] Inventor: Ishwar R. Mansukhani, Neenah, Wis.

[73] Assignee: Whittaker Corporation, Los Angeles, Calif.

[21] Appl. No.: 941,759

[22] Filed: Sep. 13, 1978

[51] Int. Cl.² .................................................. G01D 15/18
[52] U.S. Cl. .................................................. 346/1.1; 346/75
[58] Field of Search .................................................. 346/1, 75

[56] References Cited
U.S. PATENT DOCUMENTS

| | | | |
|---|---|---|---|
| 1,843,572 | 2/1932 | MacGahan | 346/1 |
| 3,063,050 | 11/1962 | Millis | 346/1 |
| 3,179,946 | 4/1965 | Dransfield | 346/1 X |
| 3,373,438 | 3/1968 | Hochberg | 346/75 |
| 3,982,251 | 9/1976 | Hochberg | 346/75 X |
| 4,095,233 | 6/1978 | Goffe | 346/75 |

*Primary Examiner*—George H. Miller, Jr.
*Attorney, Agent, or Firm*—Henry M. Bissell

[57] ABSTRACT

Opaque ink compositions suitable for ink jet printing on metal, plastic, or paper surfaces, the ink characterized by opaque properties in light, incorporating, in solution, at least one cellulosic derivative, a resin component, and at least one solvent, proportioned to give the ink property of opacity.

According to another of its aspects, this invention is a process for information recording comprising producing a fine jet of liquid, directing said jet of liquid onto a recording medium, modulating the density of said applied jet by an electric field in accordance with the information to be recorded, thereby recording said information, and thereafter applying moisture to said recording medium bearing said recorded, thereby rendering said recording opaque.

3 Claims, 1 Drawing Figure

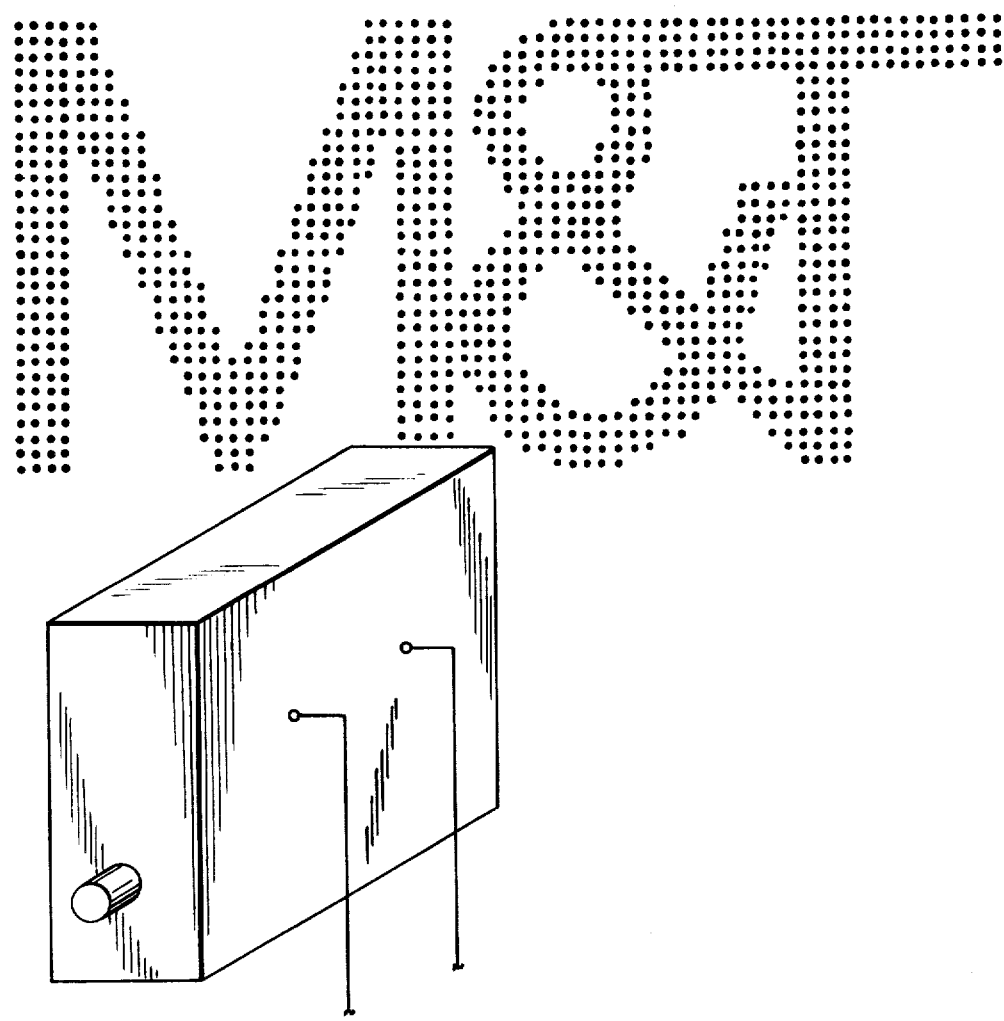

OPAQUE JET INKS

BACKGROUND OF THE INVENTION

This invention relates to inks characterized by opaque properties in light. More specifically, this invention relates to inks which are opaque in ordinary light so as to render them particularly suitable as a means for marking various materials.

Ink jet printing is a recent development in the art of applying identifying and decorative indicia to a base. In general terms, a fluid ink is forced, under pressure, through a very small orifice in an orifice block which contains a piezoelectric crystal vibrating at high frequency (50-100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge to the base medium which is to receive the decorative or informative printed indicia. Apparatus suitable for carrying out the ink jet printing process is described in detail in U.S. Pat. Nos. 3,465,350 and 3,465,351, issued Sept. 2, 1969 and it is in connection with an apparatus and process such as are described in the aforementioned patents that the ink of the present invention is designed to function.

In order to operate satisfactorily in an ink jet printing system, an ink must display a consistent drop breakup length, drop velocity and drop charge under set operating conditions.

It has been determined that an ink jet printer, described in U.S. Pat. Nos. 3,465,350 and 3,465,351, inks with viscosity of 25 cps. will perform satisfactorily depending upon the type of nozzle used. However, inks with lower viscosities perform much better. Resistivity of ink may range as high as 10,000 ohm cm. for satisfactory operations.

BRIEF DESCRIPTION OF THE DRAWINGS

The FIGURE shows schematically and greatly enlarged a perspective view of an ink jet performing the process of the invention.

DESCRIPTION OF THE INVENTION

This invention is a process for information recording comprising producing a fine jet of liquid, directing a jet of liquid onto a recording medium, modulating the density of the applied jet by an electric field in accordance with the information to be recorded, thereby recording said information, applying moisture to said recorded information, thereafter rendering said recorded information opaque.

According to another of its aspects, this invention is a process for information recording comprising producing a fine jet of liquid, directing said jet of liquid onto a recording medium, modulating the density of said applied jet by an electric field in accordance with the information to be recorded, thereby recording said information, and thereafter lowering the temperature ambient to said recorded information to the dew point, thereby rendering said recording opaque.

Inks of this invention include three basic components. The first is a colorant for providing visibility of the printed indicia. The second major component is the solvent which provides fluidity to the ink and carries in solution or suspension the resin and colorant. The third component is a resin or binder which remains on the substrate surface after printing and serves to adhere and bind the dye or pigment in position on the substrate surface. In addition to these three components which are found in nearly all fluid printing inks, various other ingredients may be utilized, including drying, dispersing and wetting agents, plasticizers, diluents and the like.

This invention, thus, relates to inks which are opaque. These inks are organic in nature, also an advantage, in that they do not have the abrasive wearing quality of many inks based on abrasive, inorganic pigments.

Inks of this invention contain resin/polymers in concentration of 1 to 80% alone or in blends, dissolved in solvents. Solvents include aliphatic alcohol and other solvents can be ketones, aldehydes, ethers, esters, glycols, glycol ethers, hydrocarbon, lactones. Typical aliphatic monovalent alcohols are methyl alcohol, ethyl alcohol, etc.

A necessary resin includes at least one member of the group consisting of cellulose derivatives such as cellulose esters (nitrocellulose, cellulose acetate and the like), and especially cellulose ethers, for example, methylcellulose, hydroxyethylcellulose, hydroxypropylcellulose, propionitrile cellulose, ethyl cellulose and benzylcellulose. The corresponding derivatives of other polysaccharides can also be used.

Suitable dyeing agents are direct dyes (substantive dyes), acid dyes, base dyes, and various oil-soluble dyes. The dye type can be chosen depending on the thinning agent combination and the binding agent type.

Preferred coloring materials are basic dye bases.

The inks can have a viscosity of 1.5 cps to 25 cps at 25° C. The preferred range is 1.8 cps to 7.5 cps.

The resistivity of ink can be as high as 10,000 ohms-cm. The preferred range is 1,500 to 4,000 ohms-cm.

Inks of this invention have adhesion on practically all substrates.

The resin component of a jet printing ink suitable for printing on coated or virgin metal must also meet a variety of requirements. Of primary importance is the ability of the resin to adhere to the coated or virgin metal surface on which the ink is printed and to maintain this strong adhesion under widely varying conditions of humidity and temperature. When the ink is applied to the metal surface, it must "wet" or adhere to a coated or virgin metal surface, even in the presence of some moisture, and must exhibit a high degree of moistureproofness, not only to maintain adhesion to the metal but also to protect the dye, which may be water sensitive, from the effects of moisture which may make the dye bleed into surrounding areas.

The resin component must also be very readily soluble in the solvent combination to form a stable, low viscosity solution that effective amounts can be dissolved in the solvent without unduly increasing the viscosity of the composition.

Synthetic, semi-synthetic and natural resins, which is to say both polymerization as well as polycondensation and polyaddition products, are suitable. In principle, all resins customary in the printing ink and paint industry, such as are, for example, described in the lacquer raw material tables of Karstne (4th edition, Hanover, 1967) and in Wagner and Sarx's work on lacquer resins (4th edition, Munich, 1959) are used.

The following, for example, are suitable resins: colophony and derivatives thereof, hydrogenated colophony, di- or polymerized colophony, as calcium or zinc salt, with colophony esterified with mono- or polyvalent alcohols; with resinifiers such as acrylic acid and butane diol or maleic acid and pentaerythritol modified colophony resin; the soluble phenol resins modified with colophony and resins based on acrylic compounds, maleinate resins, oil-free alkyd resins, styrolated alkyd resins, vinyl toluene modified alkyd resins, alkyd resins with synthetic fatty acids, linseed oil alkyd resins, ricinene alkyd resins, castor oil alkyd resins, soy oil alkyd resins, coconut oil alkyd resins, tall oil and fish oil alkyd resins, acrylated alkyd resins, also oils and oil varnishes. Also suitable are terpene resins, polyvinyl resins such as polyvinyl acetate, polyvinyl chloride, polyvinylidene chloride, polyvinyl acetals, polyvinyl alcohol, polyvinyl ether, copolymers and graft polymers with various vinyl monomers, polyacrylic resins, acrylate resins, polystyrenes, polyisobutylenes, polyesters based on phthalic acid, maleic acid, adipic acid, sebacic acid, etc.; naphthalene formaldehyde resins, furane resins, ketone resins, aldehyde resins, polyurethanes (especially urethane primary-products that cure only at elevated temperature), epoxide resins (especially resin-curer mixtures that cure only at elevated temperature) and precondensates thereof. Suitable too are primary products of unsaturated polyester resins, dialkylphthalateprepolymers, polyolefines such as polyethylene wax or polypropylene wax, indene and cumaron-indene resins, carbamide and sulphonamide resins, polyamide and polyester resins, silicone resins, rubber and derivatives thereof, for example, cyclorubber and chlorinated rubber.

A further requirement of resin is that it should have sufficient solvent release so that a desired rate of drying is obtained on a given substrate. In order to be effective in a formulation of a jet printing ink for a given substrate, the solvent medium must readily dissolve sufficient amounts of the resin component, the dye and any desirable optional components such as to achieve the desired level of adhesiveness, conductivity and visual impact of the ink composition. Further, since some degree of evaporation of solvent will occur in the ink supply and ink return systems, thereby, increasing the solids concentration in ink and solvent should have sufficient power to prevent precipitation in this situation.

Although evaporation of the solvent from the ink supply and return systems is generally undesirable, it is important that the solvent evaporate at the desired rate from the printed image area in order to leave the printed image smearproof and moisture-proof in required time after the printing operation is carried out. The solvent must achieve a satisfactory balance in evaporative properties between these opposed objectives.

Depending upon type of substrate on which ink is to be printed, it is advantageous to use a solvent which will penetrate the wax or other coating on substrates to enhance adhesion and rub resistance of the ink.

The jet ink in accordance with this invention, which contains a mixture of an aliphatic monovalent alcohol and at least one other solvent component, is easily deflected and exhibits a high particle stability. The ink in accordance with the invention also contains at least one resin. Typical aliphatic monovalent alcohols are methyl alcohol, ethyl alcohol, n-propyl alcohol, isopropyl alcohol, n-butyl alcohol, sec-butyl alcohol, tert-butyl alcohol, isobutyl alcohol, n-amyl alcohol, amyl alcohol, isoamyl alcohol, hexyl alcohol, heptyl alcohol, octyl alcohol, or a mixture of same. Aliphatic monovalent alcohols with 1 to 8 carbon atoms are particularly preferred. The weight ratio of aliphatic monovalent alcohol to other solvents is preferably 1–99:99–1, especially 30–80:70–20, and particularly 40–80:60–20.

Solvents which form the mixture for these inks are ketones, aldehydes, ethers, esters, hydrocarbons, glycol, glycol ethers and lactones.

Suitable solvents are hydrocarbons, such as hexane, heptane, octane, decane, cyclopentane, cyclohexane, benzene, toluol, xylol, and ethylbenzene; hydrocarbon halides, such as carbon tetrachloride, ethylene dichloride, trichloroethylene, tetrachloroethane, and dichlorobenzene; ether-type solvents, such as butyl ether, ethylene glycol-diethyl ether, ethylene glycol-monoethyl ether, ethylene glycol-monobutyl ether; ketone-type solvents, such as acetone, methylethyl ketone, methyl propyl ketone, methyl isobutyl ketone, methylamyl ketone, cyclohexanone; ester-type solvents, such as ethyl formate, methyl acetate, propyl acetate, butyl acetate, phenyl acetate, ethylene glycol-monoethyl ether acetate, methylpropionate; other alcohol solvents, such as diacetone alcohol or such.

This invention relates to ink jet printing ink which has excellent adhesion on various substrates. More particularly the invention relates to printing ink which is an ink vehicle which comprises, as the essential component, very high weight percent of resin or blend of resin dissolved in a blend of solvents to give viscosity in range of 1.5 cps to 25 cps at 25° C. and which is compatible with fatty oils; and various oils, resins, resinous varnishes, solvents, etc., conventionally used as printing ink materials and further, if necessary, by milling with and dispersing pigments, extenders and/or auxiliary agents in the resulting components.

A binding agent and additional additives, such as surface active agents can be added to the ink. Suitable binding agents (vehicle) are dry oils, such as linseed oil, tung oil, safflower oil, soya oil, dehydrated castor oil; semidrying oils, such as cottonseed oil and beet oil; non-drying oils, such as castor oil and olive oil, aliphatic acids and esters of same, such as oleic acid, linoleic acid, pelargonic acid, caprinic acid, ethyltrideanate and methyl laurate; dicarboxylic acid ester, such as dimethyl phthalate, diethyl phthalate, dibutylphthalate, butylbenzene phthalate, dioctylphthalate, dioctyladipate, dioctylsebacate, dibutylsebacate, monomethyladipate and monoethylpimelate; polyvalent alcohols, such as ethylene glycol, polyethylene glycol, diethylene glycol, propylene glycol, glycerine, dipropylene glycol and esters and ethers of the same, such as diethylene glycol monobutyl ether, dipropylene glycolemonoethyl ester or such.

Liquid resins with a molecular weight under 2000 can also be used, for example, polyester resins, epoxy resins and polybutadiene resins. The essential characteristic feature of the ink in accordance with the invention consists in a content of a mixture of an aliphatic monovalent alcohol and at least one other solvent. Compared to commercial nonaqueous ink, such an ink exhibits a considerably improved printing velocity. As a result of the excellent electrostatic properties deflection is very easy and the ink particles have an increased stability.

The ink in accordance with the invention is suited for jet printing devices and electrical field type printers.

The invention is described in the following on the basis of exemplified embodiments.

While there are disclosed below but a limited number of embodiments of the invention herein presented, it is possible to produce still other embodiments without departing from the inventive concepts herein disclosed. Various other modifications will be readily apparent to those skilled in the art.

EXAMPLE 1

| Nitrocellulose | 10.0 |
|---|---|
| Methanol | 75.0 |
| Methyl ethyl ketone | 50.0 |
| MgCl$_2$ | 2.0 |
| Water | 5.0 |
| | 142.0 |

By using blushing it becomes practical to get opaque prints on dark substrates without the use of pigments. Inks containing up to 40% solids have been prepared.

EXAMPLE 2

| Nitrocellulose | 35.0 |
|---|---|
| Ethyl cellulose | 5.0 |
| Methyl ethyl ketone | 20.0 |
| Methanol | 431.0 |
| Ammonium formate | 5.0 |
| | 496.0 |

By using blushing it becomes practical to get opaque prints on dark substrates without the use of pigments. Inks containing up to 40% solids have been prepared.

EXAMPLE 3

| Cellulose acetate butyrate | 6.0 |
|---|---|
| Methyl ethyl ketone | 24.0 |
| Methanol | 58.0 |
| Paratoluene sulphonic acid | 2.0 |
| | 90.0 |

By using blushing it becomes practical to get opaque prints on dark substrates without the use of pigments. Inks containing up to 40% solids have been prepared.

EXAMPLE 4

| Ethyl cellulose | 8.5 |
|---|---|
| Nitrocellulose | 30.0 |
| MgCl$_2$ | 5.0 |
| Methanol | 431.5 |
| Auramine base dye | 5.0 |

-continued

| | 480.0 |
|---|---|

EXAMPLE 5

| Cellulose acetate butyrate | 34.0 |
|---|---|
| Acryloid B-66 | 6.4 |
| Nitrocellulose 18/25 seconds | 6.9 |
| Methanol | 300.0 |
| Acetone | 330.0 |
| Methyl ethyl ketone | 57.0 |
| MgCl$_2$ | 1.5 |
| Distilled water | 14.0 |
| Yellow dye | 0.2 |
| | 750.0 |

EXAMPLE 6

| Ethyl cellulose N7 | 20.0 |
|---|---|
| Arofene 24780 | 50.0 |
| Methyl ethyl ketone | 130.0 |
| Methanol | 250.0 |
| methyl Cellosolve | 100.0 |
| Auramine base | 5.0 |
| | 555.0 |

Various resin and solvent combinations can be used to achieve opaque prints. Solids can range as high as 75%. Color is obtained by using various dyes. Drying rate is controlled by a combination of various solvents.

What is claimed is:

1. A process for information recording comprising producing a fine jet of liquid, directing said jet of colorless liquid onto a recording medium, modulating the density of the applied jet by an electric field in accordance with the information to be recorded, thereby recording said information, and subsequently adjusting the temperature ambient to said recorded information to the dew point ambient thereto, thereby rendering said recorded information opaque.

2. A process for information recording comprising producing a fine jet of liquid containing at least one dye, directing the jet of liquid onto a recording medium, modulating the density of the applied jet by an electric field in accordance with the information to be recorded, thereby recording said information and subsequently applying moisture to said recorded information.

3. A process for information recording comprising producing a fine jet of liquid, directing said jet of liquid onto a recording medium, modulating the density of the applied jet by an electric field in accordance with the information to be recorded, thereby recording said information, applying moisture to said recorded information, thereby rendering said recordation opaque.

* * * * *